United States Patent
Winkelvos et al.

(10) Patent No.: US 11,184,340 B2
(45) Date of Patent: Nov. 23, 2021

(54) APPARATUS, METHOD, AND COMPUTER PROGRAM FOR ENABLING A TRANSPORTATION VEHICLE COMPONENT AND VEHICLE-TO-VEHICLE COMMUNICATION MODULE

(71) Applicant: VOLKSWAGEN AKTIENGESELLSCHAFT, Wolfsburg (DE)

(72) Inventors: Timo Winkelvos, Sickte (DE); Alexander Tschache, Wolfsburg (DE)

(73) Assignee: Volkswagen Aktiengesellschaft

( * ) Notice: Subject to any disclaimer, the term of this patent is extended or adjusted under 35 U.S.C. 154(b) by 370 days.

(21) Appl. No.: 16/219,044

(22) Filed: Dec. 13, 2018

(65) Prior Publication Data

US 2019/0190900 A1 Jun. 20, 2019

(30) Foreign Application Priority Data

Dec. 15, 2017 (DE) ...................... 10 2017 222 879.2

(51) Int. Cl.
*H04L 29/06* (2006.01)
*B60R 16/023* (2006.01)
*B60R 25/00* (2013.01)

(52) U.S. Cl.
CPC .......... *H04L 63/062* (2013.01); *B60R 16/023* (2013.01); *B60R 25/00* (2013.01);
(Continued)

(58) Field of Classification Search
CPC . H04L 63/062; H04L 63/065; H04L 63/0876; H04L 63/12; B60R 16/023;
(Continued)

(56) References Cited

U.S. PATENT DOCUMENTS

| 6,433,685 B1 * | 8/2002 | Struble ................... B60R 25/00 340/426.28 |
| 6,606,562 B1 * | 8/2003 | Gifford .................. G07C 5/008 342/357.31 |

(Continued)

FOREIGN PATENT DOCUMENTS

| CN | 101350725 A | 1/2009 |
| CN | 101561943 A | 10/2009 |

(Continued)

OTHER PUBLICATIONS

Search Report for German Patent Application No. 10 2017 222 879.2; dated May 9, 2018.

(Continued)

*Primary Examiner* — Shahriar Zarrineh
(74) *Attorney, Agent, or Firm* — Barnes & Thornburg LLP

(57) ABSTRACT

A device, method and computer program for enabling a vehicle component and a vehicle-to-vehicle communication module. The device includes at least one interface for communication with a second vehicle component of the transportation vehicle. The second vehicle component is part of a secured cluster of vehicle components of the transportation vehicle. The device includes a control module to control the at least one interface and to receive at least one message from the second vehicle component via the at least one interface. The control module legitimates the second vehicle component based on the at least one message received from the second vehicle component. The control module enables the first vehicle component in response to the at least one received message implying that the second vehicle component has been enabled and in response to the legitimation of the second vehicle component being successful.

16 Claims, 4 Drawing Sheets

(52) U.S. Cl.
CPC ........ *H04L 63/065* (2013.01); *H04L 63/0876* (2013.01); *H04L 63/12* (2013.01)

(58) Field of Classification Search
CPC .............. B60R 25/00; B60R 2325/108; B60R 2325/20; B60R 2325/30; H04W 4/40
USPC ......................................................... 713/171
See application file for complete search history.

(56) References Cited

U.S. PATENT DOCUMENTS

| | | | | |
|---|---|---|---|---|
| 8,520,695 | B1* | 8/2013 | Rubin | H04W 56/0035 370/445 |
| 8,526,621 | B2* | 9/2013 | Rabin | H04L 9/085 380/282 |
| 8,848,608 | B1* | 9/2014 | Addepalli | H04Q 9/00 370/328 |
| 9,002,534 | B2* | 4/2015 | Grasso | B60R 25/00 701/1 |
| 9,003,492 | B2* | 4/2015 | Katar | H04L 63/0892 726/4 |
| 9,116,786 | B2* | 8/2015 | Ricci | G06F 11/0781 |
| 9,124,421 | B2* | 9/2015 | Zhao | H04L 9/0897 |
| 9,298,184 | B2* | 3/2016 | Bartels | B60W 50/14 |
| 9,421,945 | B1* | 8/2016 | Smathers | B60R 25/08 |
| 9,705,678 | B1* | 7/2017 | Wang | H04L 63/1466 |
| 9,965,636 | B2* | 5/2018 | Litichever | H04L 12/40143 |
| 10,027,490 | B2* | 7/2018 | Tschache | H04L 9/3268 |
| 10,237,077 | B2 | 3/2019 | Winkelvos et al. | |
| 10,285,051 | B2* | 5/2019 | Alfred | H04L 9/0838 |
| 2002/0023223 | A1* | 2/2002 | Schmidt | G06F 21/572 713/187 |
| 2002/0131592 | A1* | 9/2002 | Hinnant | H04L 9/0662 380/46 |
| 2003/0085558 | A1* | 5/2003 | Forssell | B60R 21/16 280/741 |
| 2003/0137409 | A1* | 7/2003 | Kikkawa | B60R 25/04 340/426.11 |
| 2004/0210757 | A1* | 10/2004 | Kogan | B60R 25/00 713/182 |
| 2005/0038592 | A1* | 2/2005 | de Sylva | F41H 11/08 701/101 |
| 2006/0085644 | A1* | 4/2006 | Isozaki | H04L 9/0844 713/171 |
| 2008/0077299 | A1* | 3/2008 | Arshad | E02F 9/26 701/50 |
| 2008/0192929 | A1* | 8/2008 | Knechtel | G06F 21/72 380/44 |
| 2008/0260147 | A1* | 10/2008 | Shin | H04L 9/0643 380/46 |
| 2009/0047929 | A1 | 2/2009 | Chesnutt et al. | |
| 2009/0157268 | A1* | 6/2009 | Chiba | G08G 1/168 701/53 |
| 2009/0217031 | A1* | 8/2009 | Kuhls | G06F 21/606 713/153 |
| 2010/0146174 | A1* | 6/2010 | Djordjevic | H04L 12/40202 710/110 |
| 2012/0221173 | A1* | 8/2012 | Ampunan | H04W 4/48 701/2 |
| 2013/0204466 | A1* | 8/2013 | Ricci | G06F 3/0484 701/2 |
| 2014/0016781 | A1* | 1/2014 | Geiger | H04L 9/0816 380/277 |
| 2014/0270172 | A1* | 9/2014 | Peirce | H04L 9/083 380/270 |
| 2014/0380442 | A1* | 12/2014 | Addepalli | H04L 67/12 726/6 |
| 2015/0020152 | A1* | 1/2015 | Litichever | G06F 21/604 726/1 |
| 2015/0172919 | A1* | 6/2015 | Basnayake | H04W 4/029 455/411 |
| 2015/0293748 | A1* | 10/2015 | Falk | H04L 9/3234 713/193 |
| 2015/0321642 | A1* | 11/2015 | Schwepp | G06F 21/88 701/36 |
| 2016/0082903 | A1* | 3/2016 | Haggerty | B60R 16/023 701/23 |
| 2016/0142491 | A1* | 5/2016 | Engel | H04B 7/15507 340/902 |
| 2016/0219028 | A1* | 7/2016 | Baltes | H04W 4/40 |
| 2016/0280371 | A1* | 9/2016 | Canavor | G05D 1/104 |
| 2016/0344705 | A1* | 11/2016 | Stumpf | H04W 4/44 |
| 2016/0362084 | A1* | 12/2016 | Martin | G01C 21/34 |
| 2017/0043731 | A1 | 2/2017 | Kim et al. | |
| 2017/0093866 | A1* | 3/2017 | Ben-Noon | H04L 63/10 |
| 2017/0107747 | A1* | 4/2017 | Dente | E05B 81/04 |
| 2017/0111178 | A1* | 4/2017 | Winkelvos | H04W 12/0431 |
| 2017/0134382 | A1* | 5/2017 | Darnell | H04L 63/10 |
| 2017/0302452 | A1* | 10/2017 | Nanjundappa | H04W 12/03 |
| 2017/0359365 | A1* | 12/2017 | van den Berg | H04L 63/20 |
| 2017/0361805 | A1* | 12/2017 | Izraeli | B60R 25/00 |
| 2018/0043879 | A1* | 2/2018 | Ichikawa | B60L 53/62 |
| 2018/0060590 | A1* | 3/2018 | Hosamane | G06F 21/575 |
| 2018/0182252 | A1* | 6/2018 | Govindillam | G06Q 20/102 |
| 2019/0089717 | A1* | 3/2019 | Dolev | H04L 9/0866 |
| 2019/0215185 | A1* | 7/2019 | Hellenthal | H04L 12/417 |
| 2020/0273268 | A1* | 8/2020 | Bhattacharyya | H04L 12/40169 |

FOREIGN PATENT DOCUMENTS

| | | | |
|---|---|---|---|
| CN | 105644505 A | 6/2016 | |
| CN | 106789024 A | 5/2017 | |
| CN | 107040368 A | 8/2017 | |
| DE | 102004049297 A1 * | 4/2006 | ........... B60W 50/00 |
| DE | 102005024818 A1 | 11/2006 | |
| DE | 102007058975 A1 | 6/2009 | |
| DE | 102008015195 A1 | 10/2009 | |
| DE | 102014017618 A1 * | 6/2016 | ........... H04W 12/06 |
| EP | 3148152 A1 | 9/2015 | |
| EP | 3157281 A1 | 4/2017 | |
| GB | 2438434 A * | 11/2007 | ......... G07C 9/00857 |
| JP | 2009010718 A | 1/2009 | |
| JP | 2014107804 A * | 6/2014 | |
| KR | 101651648 B1 * | 8/2016 | |

OTHER PUBLICATIONS

Office Action for Chinese Patent Application No. 201811541820.6; dated Feb. 2, 2021.

* cited by examiner

APPARATUS, METHOD, AND COMPUTER PROGRAM FOR ENABLING A TRANSPORTATION VEHICLE COMPONENT AND VEHICLE-TO-VEHICLE COMMUNICATION MODULE

PRIORITY CLAIM

This patent application claims priority to German Patent Application No. 10 2017 222 879.2, filed 15 Dec. 2017, the disclosure of which is incorporated herein by reference in its entirety.

SUMMARY

Illustrative embodiments relate to a device, a method and a computer program for enabling a transportation vehicle component and to a vehicle-to-vehicle communication module, more specifically, but not exclusively, to enabling a first transportation vehicle component based on a second transportation vehicle component already enabled by a secured cluster of transportation vehicle components.

BRIEF DESCRIPTION OF THE DRAWINGS

Disclosed embodiments are described in further detail below with reference to the drawings, to which exemplary embodiments are not generally limited. Shown are.

DETAILED DESCRIPTION

Figure 1:
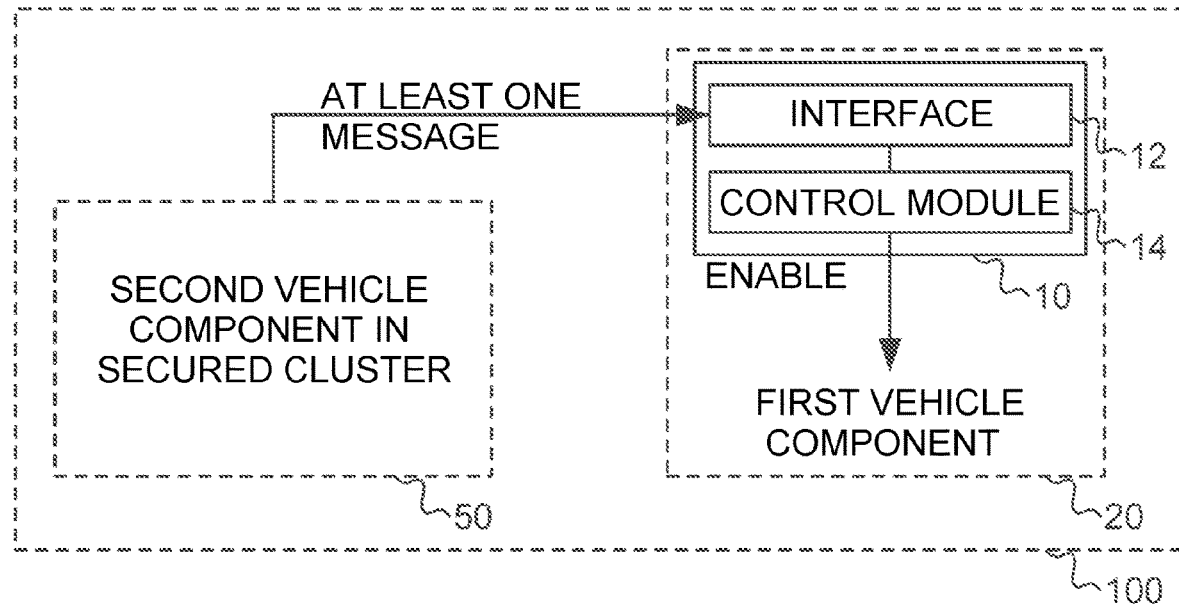
FIG. 1 shows a block diagram of a device for enabling a transportation vehicle component.

Transportation vehicles comprise a plurality of different transportation vehicle components—from the drive modules, such as the transmission and the engine, via communication modules such as a vehicle-to-vehicle communication interface or a mobile radio interface to comfort functions, such as seat heaters. To prevent thefts of transportation vehicle components and ensure that transportation vehicle components can only be used in the transportation vehicle in which they were fitted by the manufacturer or by a specialist workshop, it may be desirable to couple the transportation vehicle components to a transportation vehicle and only enable them for use if they are in the correct transportation vehicle.

European patent application EP 3 148 152 A1 describes a method for the secure distribution of cryptographic keys for control units in transportation vehicles. The European patent application EP 3 157 281 A1 describes a method for protected communication by a transportation vehicle, which is also based on generating and distributing key pairs.

There is a need for an improved approach to enabling the use of transportation vehicle components.

Disclosed embodiments provide a device, method and computer program as well as a vehicle-to-vehicle communication module.

Exemplary embodiments create execution devices, methods and a computer program for enabling a transportation vehicle component of a transportation vehicle, and a vehicle-to-vehicle communication module. Enabling in the following refers to the fact that the transportation vehicle component that is enabled can be used in the normal operation of the transportation vehicle. Prior to the enabling of a transportation vehicle component, for example, a diagnosis is performed of the transportation vehicle component or the functionality necessary to enable the transportation vehicle component. The full range of functionality of the transportation vehicle component, for example, the sending and receiving of vehicle-to-vehicle communication signals in the case of a vehicle-to-vehicle communication module, can be used, for example, only after the transportation vehicle component has been enabled.

In at least some exemplary embodiments the enabling is based on a transitive use of a previously carried out enabling operation: if it is known that a secured cluster of other transportation vehicle components, such as an immobilizer system or a theft protection system, is enabled in the transportation vehicle, then this information can then be used to also enable other transportation vehicle components. A precondition for this can be to communicate with a transportation vehicle component from the cluster, wherein communicating in this case can mean simply receiving or detecting a message of the transportation vehicle component on a bus of the transportation vehicle. On the basis of this message it can be determined, for example, that the cluster is enabled (in other words, the security functionality of the cluster has detected, for example, that no transportation vehicle component of the secured cluster has been compromised) and that a legitimacy of the transportation vehicle component from which the message was received can be determined (e.g., using a cryptographic method or a plausibility check of the message). If these two criteria are met, then the transportation vehicle component to be enabled can be enabled.

Exemplary embodiments create a device for enabling a first transportation vehicle component of a transportation vehicle. The device comprises at least one interface, designed for communication with a second transportation vehicle component of the transportation vehicle. The second transportation vehicle component is part of a secured cluster of transportation vehicle components of the transportation vehicle, such as an engine immobilizer cluster of the transportation vehicle or an anti-theft cluster of the transportation vehicle. The device also comprises a control module, designed to control the at least one interface. The control module is further designed to receive at least one message from the second transportation vehicle component via the at least one interface. The control module is further designed to legitimate the second transportation vehicle component based on the at least one message received from the second transportation vehicle component. The control module is also designed to enable the first transportation vehicle component if the at least one received message implies that the second transportation vehicle component has been enabled based on the secured cluster of transportation vehicle components and if the legitimation of the second transportation vehicle component is successful.

The use of the knowledge that the second transportation vehicle component was enabled by the secured cluster enables the security, which has been thereby achieved, also to be used (transitively) for other transportation vehicle components, such as the first transportation vehicle component. At the same time, in at least some exemplary embodiments the first transportation vehicle component is not part of the secured cluster—if there is a defect in the first transportation vehicle component the secured cluster is therefore not immobilized. By the legitimation of the second transportation vehicle component it is now possible to check that the second transportation vehicle component a) is a transportation vehicle component of the secured cluster, and b) the transportation vehicle component is part of the secured cluster of the "correct" transportation vehicle.

In at least some exemplary embodiments the control module is designed to legitimate the second transportation vehicle component based on a challenge-response authentication procedure. In this procedure, a value derived from a shared secret (such as a cryptographic key), which is calculated for both transportation vehicle components, can be compared to legitimate the second transportation vehicle component with respect to the first transportation vehicle component. In addition, if, for example, only messages that are used for determining the legitimacy can include the derived value, then a cryptographic signing or encryption of all messages can be avoided, for example.

In some exemplary embodiments, the control module can be designed to legitimate the second transportation vehicle component by a plausibility check of the contents of the at least one message. Thus, for example, a legitimation of the second transportation vehicle components can be possible without cryptographically secured messages needing to be used.

In at least some exemplary embodiments the control module is designed to legitimate the second transportation vehicle component based on cryptographically protected messages of the second transportation vehicle component. This can enable, for example, the legitimation of the second transportation vehicle component using tried-and-tested cryptographic methods.

For example, the cryptographically protected messages can be cryptographically signed. Alternatively or in addition, the cryptographically protected messages can be cryptographically encrypted. By checking the signature or by decrypting the messages based on at least one previously known key, for example, the identity of the communicating transportation vehicle component can be determined or verified, and the second transportation vehicle component can be thereby legitimated. Alternatively or in addition, the cryptographically protected messages can comprise a calculated value based on a cryptographic key. In this way, for example, all or a cluster of transportation vehicle components for a transportation vehicle can comprise the same key. If these calculate a value from this key and a random number, then this value can be verified by another transportation vehicle component with the same key using the random number, and therefore the affiliation of the transportation vehicle components to the same transportation vehicle or to the same cluster of transportation vehicles can be determined. The random number can be provided, for example, by the transportation vehicle component ("sink", for example, the first transportation vehicle component) which requests the calculated value from another transportation vehicle component ("source", for example, the second transportation vehicle component) to verify the identity of the other transportation vehicle component (challenge-response procedure), or the random number can be provided by an independent third ("trustworthy") entity or derived therefrom.

In some exemplary embodiments, the control module can be designed to store cryptographic information on previously received cryptographically protected messages from the second transportation vehicle component. Alternatively, the control module can be designed to obtain the cryptographic information at the time of installation of the device, of the first transportation vehicle component or the second transportation vehicle component. The cryptographic information may include, for example, information relating to a cryptographic key, which is used at least by the second transportation vehicle component. The control module can be designed to legitimate the second transportation vehicle component if cryptographically protected messages, which were received within a predefined time interval before the enabling of the transportation vehicle component via the at least one interface, are in accordance with the stored cryptographic information. In this way, the messages of the second transportation vehicle component can be compared with the cryptographic information to legitimate the second transportation vehicle component. For example, the cryptographic information can comprise the key for the transportation vehicle or cluster, or for any communication between two transportation vehicle components a (shared) key can be included. Also conceivable is a system with private and public keys, wherein the cryptographic information may comprise the public keys of the multiplicity of additional transportation vehicle components.

In some exemplary embodiments, the receipt of the at least one message from the second transportation vehicle component can imply that the second transportation vehicle component has been enabled based on the secured cluster of transportation vehicle components. For example, the second transportation vehicle component can be designed not to communicate unless it has been enabled by the secured cluster. Thus, the reception of the message can be deemed to be confirmation that the second transportation vehicle component has been enabled. In some exemplary embodiments a bi-directional communication to legitimate the second transportation vehicle component can therefore be avoided.

In at least some exemplary embodiments, the at least one received message implies that the second transportation vehicle component has been enabled based on the secured cluster of transportation vehicle components if the at least one received message implies that the second transportation vehicle component has a predefined state. For example, the received message can comprise information about whether the second transportation vehicle component is in an activated or a non-activated state. Alternatively or additionally, the received message can include information about whether the secured cluster is trustworthy or not. In some exemplary embodiments, the at least one received message may imply that the second transportation vehicle component has been enabled based on the secured cluster of transportation vehicle components, if the at least one received message implies that a predefined action is being executed by the second transportation vehicle component. For example, the received message can comprise information about actions performed by the second transportation vehicle component in normal operation, for example, measurements or messages which indicate the normal operation of the second transportation vehicle component.

In at least some embodiments the transportation vehicle component is not part of the secured cluster of transportation vehicle components. For example, the secured cluster can enable the second transportation vehicle component without involving the transportation vehicle component or the device. This can reduce the complexity of the secured cluster. At the same time, it is possible to prevent, for example, a failure of the first transportation vehicle component from immobilizing the secured cluster.

In some exemplary embodiments, the secured cluster of transportation vehicle components can comprise at least one further device according to any one of the preceding claims. The device in conjunction with the secured cluster of transportation vehicle components can form a further secured cluster of transportation vehicle components. Thus, the enabling of the second transportation vehicle component can be propagated, for example, in a transitive way. For example, the second transportation vehicle component can be enabled based on the secured cluster, for example, the immobilizer system. The device can use this information to enable the first transportation vehicle component. The first transportation vehicle component (with the device), together with the original secured cluster, can form a further secured cluster of transportation vehicle components. Thus, for example, the enabling of the first transportation vehicle component can be used to enable a third transportation vehicle component (with a further device in accordance with one of the previous exemplary embodiments). In other words, the enabling of the first transportation vehicle component based on the second transportation vehicle component can be propagated transitively to the third transportation vehicle component.

In some exemplary embodiments, the at least one message, on which the enabling of the first transportation vehicle component is based, can be at least one message that is used for the normal operation of the first transportation vehicle component or for the normal operation of the second transportation vehicle component. The at least one message, on which the enabling of the first transportation vehicle component is based, can be at least one message which is not received solely for the purpose of enabling the transportation vehicle first transportation vehicle component via the at least one interface, or which is not sent from the second transportation vehicle component solely for the purpose of enabling the first transportation vehicle component. The use of messages, which are sent from the second transportation vehicle component anyway, can make a bi-directional communication for the purpose of enabling the first transportation vehicle component unnecessary.

Exemplary embodiments also create a vehicle-to-vehicle communication module having the device in accordance with an exemplary embodiment. The vehicle-to-vehicle communication module can be the first transportation vehicle component. A vehicle-to-vehicle communication of the vehicle-to-vehicle communication module can be based on the enabling of the vehicle-to-vehicle communication module. Thus, in some exemplary embodiments it is possible to prevent the vehicle-to-vehicle communication module from being operated outside of the transportation vehicle.

Exemplary embodiments further create a method for enabling a first transportation vehicle component of a transportation vehicle. The method comprises receiving at least one message from a second transportation vehicle component. The second transportation vehicle component is part of a secured cluster of transportation vehicle components of the transportation vehicle. The method further comprises legitimating the second transportation vehicle component based on the at least one message received from the second transportation vehicle component. The method further comprises enabling the first transportation vehicle component if the at least one received message implies that the second transportation vehicle component has been enabled based on the secured cluster of transportation vehicle components and if the legitimation of the second transportation vehicle component is successful.

The use of the knowledge that the second transportation vehicle component was enabled by the secured cluster enables the security, which has been thereby achieved, also to be used (transitively) for other transportation vehicle components, such as the first transportation vehicle component. At the same time, in at least some exemplary embodiments the first transportation vehicle component is not part of the secured cluster—if there is a defect in the first transportation vehicle component the secured cluster is therefore not immobilized. By the legitimation of the second transportation vehicle component it is now possible to check that the second transportation vehicle component a) is a transportation vehicle component of the secured cluster, and b) the transportation vehicle component is part of the secured cluster of the "correct" transportation vehicle.

Exemplary embodiments also create a program with a program code for implementing the method if the program code is executed on a computer, a processor, a control module or a programmable hardware component.

Various exemplary embodiments will now be described in more detail with reference to the accompanying drawings, in which several exemplary embodiments are shown. In the figures, the thickness dimensions of lines, layers and/or regions are shown exaggerated for the sake of clarity.

In the following description of the attached figures, which only show some exemplary examples, the same reference numerals can be used to designate identical or equivalent components. In addition, collective reference numerals can be used for components and objects, which occur multiple times in at least one exemplary embodiment or in a drawing, but which are described together in relation to one or more features. Components or objects described with the same or collective reference numerals can be embodied in the same way in terms of individual, multiple or all features, for example, in terms of their dimensions, but may also be embodied differently, unless otherwise explicitly or implicitly given by the description.

Although exemplary embodiments can be modified and amended in different ways, the exemplary embodiments shown in the figures are examples and are described in detail herein. It should, however, be made clear that it is not intended to restrict exemplary embodiments to the particular disclosed forms, but that instead exemplary embodiments should cover functional and/or structural modifications, equivalents and alternatives which lie within the field of the disclosure. Identical reference numerals designate the same or similar elements throughout the description of the figures.

It is important to note that for any element, which is designated as being "connected" or "coupled" to any other element, it can either be directly connected or coupled to the other element or else intervening elements may be present. If on the other hand, an element is designated as being "directly connected" or "directly coupled" to another element, then there are no intervening elements present. Other terms used to describe the relationship between elements should be interpreted in a similar way (e.g., "between" compared to "directly between", "adjacent" compared to "directly adjacent", etc.).

The terminology used herein is used only for the description of certain exemplary embodiments and is not intended to restrict the exemplary embodiments. As used herein, the singular forms "a" and "an" and "the/this" are also meant to include the plural forms, unless the context clearly indicates otherwise. In addition, it should be clarified that the expressions such as "contains", "containing", "has", "comprises", "comprising" and/or "having" as used herein, indicate the presence of cited features, whole numbers, operations, work processes, elements and/or components, but do not exclude the presence or addition of one more or one or a plurality of features, whole numbers, operations, work processes, elements, components and/or groups thereof.

Unless otherwise defined, all of the terms used herein (including technical and scientific terms) have the same meanings as would be ascribed to them by an average person skilled in the art in the field to which the exemplary embodiments belong. It should also be clarified that expressions, such as those that are defined in commonly used dictionaries, are to be interpreted as if they had the meaning consistent with their meaning in the context of the relevant technology, and should not be interpreted in an idealized or overly formal sense, unless this is expressly defined herein.

At least some exemplary embodiments create quantitatively and transitively scalable cluster authentications in a transportation vehicle (or more generally, in a distributed system).

In at least one exemplary embodiment, a Car2Car (vehicle-to-vehicle) control unit (which can be used e.g., for a digital roof antenna) must not be used outside of the transportation vehicle to send C2C messages. The permission for sending a message can presuppose, for example, various properties of the transportation vehicle status, which when combined can enable a qualitative and quantitative increase in trust in the property. Also, some other functions, which transmit externally to the transportation vehicle, can request, for example, that (only) the real transportation vehicle transmits. This concept can be transferred, for example, to other control units in the transportation vehicle, which are not intended to be used outside the transportation vehicle, and the concept is not limited to car2Car control units.

In some systems it can be determined whether a control unit is situated in a particular transportation vehicle by checking the transportation vehicle identification number (VIN) over the transportation vehicle bus. Alternatively or additionally, the corresponding control unit can be incorporated into the immobilizer cluster and/or in the component protection system (protection of components from theft). These connections can be functions which are only directly intended for determining the affiliation of the control unit to the transportation vehicle, i.e., additional function(s). The connections can be used with a separate function for determining whether the transportation vehicle is located in an authenticated cluster (usually a master/slave system). It may be noted, however, that the checking of the VIN in some cases may not be technically sufficient, since an attacker might be able to manipulate the VIN (also known as "spoofing"). In the case where the control unit is connected into the immobilizer cluster there may be a risk, for example, that the transportation vehicle could be immobilized in the event of a fault in the control unit, wherein the control unit has nothing to do with the enabling of the immobilizer unit from an anti-theft point of view. In addition, the connection may involve the integration of an additional function without any functional benefit for the control unit, thus creating an overhead (additional administrative effort). In addition, scaling may be difficult because these connections are usually master/slave systems, i.e., the control unit can only detect, for example, the presence of a further control unit.

FIG. 1 shows a block diagram of a device 10 for enabling a first transportation vehicle component 20 of a transportation vehicle 100. The device 10 comprises at least one interface 12, designed for communication with a second transportation vehicle component 50 of the transportation vehicle 100. The second transportation vehicle component 50 is part of a secured cluster of transportation vehicle components of the transportation vehicle 100. The device 10 also comprises a control module 14, designed to control the at least one interface 12. The control module 14 is further designed to receive at least one message from the second transportation vehicle component 50 via the at least one interface 12. The control module 14 is further designed to legitimate the second transportation vehicle component 50 based on the at least one message received from the second transportation vehicle component 50. The control module 14 is also designed to enable the first transportation vehicle component 20 if the at least one received message implies that the second transportation vehicle component 50 has been enabled based on the secured cluster of transportation vehicle components, and if the legitimation of the second transportation vehicle component 50 is successful.

FIG. 1 also shows the first transportation vehicle component 20 comprising the device 10, and the transportation vehicle 100 comprising the first transportation vehicle component 20 with the device 10 and the second transportation vehicle component 50. The at least one interface 12 is coupled to the control module 14.

Figure 2:
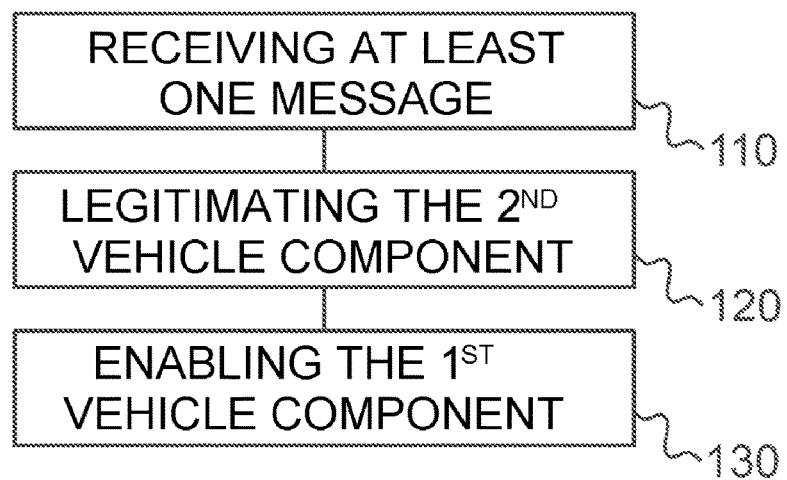
FIG. 2 shows a flow diagram of a method for enabling a transportation vehicle component.

FIG. 2 shows a corresponding method for enabling of the first transportation vehicle component 20 of the transportation vehicle 100. The method comprises receiving 110 the at least one message from the second transportation vehicle component 50. The second transportation vehicle component 50 is part of the secured cluster of transportation vehicle components of the transportation vehicle 100. The method further comprises legitimating 120 the second transportation vehicle component 50 based on the at least one message received from the second transportation vehicle component 50. The method further comprises enabling 130 the first transportation vehicle component 20 if the at least one received message implies that the second transportation vehicle component 50 has been enabled based on the secured cluster of transportation vehicle components and if the legitimation of the second transportation vehicle component 50 is successful. The following description refers both to the device 10 of FIG. 1 as well as to the method of FIG. 2.

The enabling of transportation vehicle components in at least some exemplary embodiments refers to the enabling or activation of a normal operation of the transportation vehicle component and/or enabling the use of the transportation vehicle component. Prior to the enabling of a transportation vehicle component, for example, a diagnosis can be performed of the transportation vehicle component or the functionality necessary to enable the transportation vehicle component. Enabling the transportation vehicle component allows the full range of functionality of the transportation vehicle component to be enabled. The enabling of the first transportation vehicle component can activate, for example, the use of the transportation vehicle component in normal operation. A transportation vehicle component (for example, the first transportation vehicle component, the second transportation vehicle component or the transportation vehicle components of the secured cluster of transportation vehicle components) can be enabled, for example, when an examination reveals that the transportation vehicle component is located in the transportation vehicle for which it is intended.

The first transportation vehicle component, the second transportation vehicle component and/or the transportation vehicle components of the secured cluster can be, for example, components of the transportation vehicle of the transportation vehicle that are designed to communicate with other transportation vehicle components within the transportation vehicle, such as control units, actuators, sensors, control modules of the transportation vehicle. In at least one exemplary embodiment, the first transportation vehicle component can be, for example, a vehicle-to-vehicle communication module. For example, the first transportation vehicle component, the second transportation vehicle component and/or the transportation vehicle components of the secured cluster can be designed to communicate (with each other) via a transportation vehicle bus, such as a Controller Area Network Bus, CAN bus, or a LIN (Local Interconnect Network).

In at least some exemplary embodiments the transportation vehicle 100 can correspond, for example, to an agricultural transportation vehicle, a water-borne transportation vehicle, an aircraft, a railway transportation vehicle, a road transportation vehicle, a car, an all-terrain transportation vehicle, a motor transportation vehicle or a heavy goods transportation vehicle.

The at least one interface 12 can correspond, for example, to one or more inputs and/or one or more outputs for receiving and/or transmitting information, for example, in digital bit values, based on a code, within a module, between modules, or between modules of different entities. The at least one interface 12 can be designed, for example, to communicate with the second transportation vehicle component 50 via the control network bus or the local connection network.

In at least some exemplary embodiments, the communication with the second transportation vehicle component 50 can be a bi-directional communication. For example, the at least one interface 12 can be designed to transmit messages to the second transportation vehicle component and to receive messages from the second transportation vehicle component. For example, the control module 14 can be designed to perform a challenge-response procedure by sending a message to the second transportation vehicle component and receiving the response from the second transportation vehicle component.

Alternatively, the communication with the second transportation vehicle component 50 can be a unidirectional communication. For example, the communication can comprise (only) messages that are transmitted from the second transportation vehicle component and received by the at least one interface. For example, the at least one interface 12 can be designed to receive or listen in on messages that are transmitted from the second transportation vehicle component via the control network bus or via the local connection network, without these messages being explicitly addressed to the first transportation vehicle component 20 or the device 10. In at least some exemplary embodiments the at least one interface 12 can be designed to receive messages from the second transportation vehicle component 50.

In at least some exemplary embodiments, the secured cluster of transportation vehicle components can comprise a plurality of transportation vehicle components that are interconnected such that a compromise of any transportation vehicle component of the plurality of transportation vehicle components prevents enabling of the other transportation vehicle components of the plurality of transportation vehicle components of the secured cluster. For example, the transportation vehicle components of the secured cluster can mutually ensure that no transportation vehicle component of the secured cluster has been compromised or is being compromised. In at least some exemplary embodiments the first transportation vehicle component 20 is not part of the secured cluster of transportation vehicle components. A defect in the first transportation vehicle component 20 in at least some embodiments does not prevent the enabling of the transportation vehicle components of the secured cluster. In some exemplary embodiments, the transportation vehicle components of the secured cluster can protect each other against tampering, for example, against transportation vehicle components of the secured cluster being removed or replaced, or against transportation vehicle components of the secured cluster being used outside of the transportation vehicle to which they are assigned. In some exemplary embodiments, the secured cluster can be additionally based on an action by the driver of the transportation vehicle, such as the triggering of an engine start or on the insertion or turning of a transportation vehicle key. In some exemplary embodiments the secured cluster can also comprise a transportation vehicle key of the transportation vehicle, enabling the transportation vehicle components of the secured cluster can be based upon the requirement that the transportation vehicle key provides an enable signal. The terms "ensure", "protect" and "prevent" are not to be understood in an absolute sense; measures that provide a sufficiently high, even if not one hundred percent protection, also fall under the terms "ensure", "protect" and "prevent", so that a secured cluster can also be a cluster that can be penetrated in exceptional cases. The secured cluster can enable the second transportation vehicle component without involving the transportation vehicle component 20 or the device 10.

In some exemplary embodiments, the secured cluster can be an immobilizer system of the transportation vehicle. The immobilizer system can comprise, for example, the transportation vehicle components of the transportation vehicle 100, on the integrity of which an engine immobilization of the transportation vehicle 100 is based. The immobilizer system can comprise, for example, the transportation vehicle key for the transportation vehicle. In some exemplary embodiments, the transportation vehicle components of the transportation vehicle locking cluster can be enabled if the transportation vehicle components of the transportation vehicle locking cluster are trustworthy (i.e., have not been compromised, tampered with), and the transportation vehicle key provides the (correct) enable signal.

In at least some exemplary embodiments, the secured cluster can be an anti-theft system of the transportation vehicle. In the anti-theft system, for example, transportation vehicle components of the transportation vehicle can protect each other against being removed from the transportation vehicle. After the removal of a transportation vehicle component of the anti-theft cluster, for example, an operation of the removed transportation vehicle component in another transportation vehicle can be prevented. Removal of one of the components of the anti-theft cluster can trigger an alarm, for example. Alternatively or additionally, the anti-theft cluster of the transportation vehicle can be a cluster of components of the transportation vehicle, which are designed to obstruct or prevent a theft of the entire transportation vehicle. For example, the anti-theft cluster of a transportation vehicle can comprise one or more elements of the group of an alarm component of the transportation vehicle, a locking component of the transportation vehicle, a key component of the transportation vehicle and a tracking component of the transportation vehicle.

In exemplary embodiments, the control module 14 can be any controller or processor or a programmable hardware component. For example, the control module 14 can also be implemented as software, which is programmed for a corresponding hardware component. In this respect, the control module 14 can be implemented as programmable hardware with appropriately adapted software. Any type of processors, such as digital signal processors (DSPs), can be used for this. Exemplary embodiments are not restricted to a specific type of processor. Any number of processors or even a plurality of processors is conceivable for the implementation of the control module 14.

In at least some exemplary embodiments the reception of the at least one message from the second transportation vehicle component comprises receiving the at least one message via a bus system or via a peer-to-peer network system (from the word peer meaning "an equal"). The at least one message can be addressed, for example, to the first transportation vehicle component 20 or the device 10. Alternatively, the control module 14 can be designed to, via the at least one interface 12, listen on the transportation vehicle bus and receive the at least one message, even though this does not specify a dedicated recipient or other recipient. For example, the at least one message, on which the enabling of the first transportation vehicle component 20 is based, can be at least one message that is used for the normal operation of the first transportation vehicle component 20 or for the normal operation of the second transportation vehicle component 50. In other words, the at least one message, on which the enabling of the first transportation vehicle component 20 is based, can be at least one message which is not received solely for the purpose of enabling the transportation vehicle component 20 via the at least one interface 12, or which is not sent from the second transportation vehicle component 50 solely for the purpose of enabling the first transportation vehicle component. In some exemplary embodiments, the control module 14 can be designed to receive the at least one message in response to a request/challenge to the second communication module, for example, as part of a challenge-response authentication process.

In at least some exemplary embodiments, a successful legitimation of the second transportation vehicle component 50 by the control module 14 means or implies that the control module 14 trusts the second transportation vehicle component 50. The successful legitimation 50 can mean or imply that the control module 14 is sufficiently secure, that the second transportation vehicle component 50 is part of the secured cluster, that the secured cluster is designated for the transportation vehicle 100, and/or that the second transportation vehicle component 50 is designated for the secured cluster. The term "designated" in this context can mean or imply that the secured cluster has been (cryptographically) coupled with the transportation vehicle (also colloquially, "dongled") and/or the second transportation vehicle component 50 has been (cryptographically) coupled/dongled with the other transportation vehicle components of the secured cluster, by, for example, a manufacturer or specialist workshop of the transportation vehicle manufacturer. The legitimation of the second transportation vehicle component 50 enables the control module 14 to check whether the at least one message that it receives is a message from the second transportation vehicle component 50, which is part of the secured cluster. The legitimation of the second transportation vehicle component 50 can comprise, for example, determine and/or identifying an identity of the second transportation vehicle component 50 and/or verifying an affiliation of the second transportation vehicle component 50 to the secured cluster.

The control module 14 may be designed, for example, to decide the legitimacy of the second transportation vehicle component 50 based on the at least one message received from the second transportation vehicle component 50. In some exemplary embodiments, the control module 14 can be designed to determine the legitimacy of the second transportation vehicle component based solely on one (single) received message. In some examples, the control module 14 is designed not to send any messages to the second transportation vehicle component prior to receiving the at least one message, on which the legitimacy of the second transportation vehicle component is based. Alternatively, the at least one message can be a response to a request or challenge that the control module 14 sends to the second transportation vehicle component 50.

For example, the control module 14 can be designed to legitimate the second transportation vehicle component 50 based on a challenge-response authentication procedure. For example, the control module 14 can be designed to send a challenge or request (of the challenge-response authentication procedure) to the second transportation vehicle component, and the at least one message from the second transportation vehicle component 50 can be the response to the challenge or request. In some exemplary embodiments, the control module 14 and the second transportation vehicle component 50 can comprise a shared secret, for example, a shared cryptographic key. The control module 14 can be designed to challenge the second transportation vehicle component to calculate a value based on a random number or a random character string and based on the shared secret. The control module 14 can be designed to transmit the random number or the random character string to the second transportation vehicle component 50, possibly together with the challenge. The control module 14 can be designed to receive the value calculated by the second transportation vehicle component 50 included in the at least one message from the second transportation vehicle component. The control module 14 can be designed to calculate the value based on the random number or the random character string and based on the shared secret itself, and to compare the self-calculated value with the value calculated by the second transportation vehicle component 50 to legitimate the second transportation vehicle component. For example, the control module 14 can comprise a shared secret for each additional transportation vehicle component to be legitimated. Alternatively, the shared secret can be the same for all transportation vehicle components of a transportation vehicle. The shared secret can be set, for example, during the manufacture of the transportation vehicle or during the installation of a transportation vehicle component by a specialist workshop.

Alternatively or in addition, the cryptographically protected messages can comprise a calculated value based on a cryptographic key (which can also be implemented in a similar way to that of a challenge-response authentication procedure). In at least some exemplary embodiments, the control module 14 and the second transportation vehicle component 50 comprise a shared secret, such as a cryptographic key. In some exemplary embodiments, all or a cluster of transportation vehicle components for a transportation vehicle can comprise the same key. The control module 14 can be designed to receive a calculated value from the second transportation vehicle component 50 based on the cryptographic key and on a random number or a random character string. In some exemplary embodiments, the control module 14 can be designed to receive the random number or the random character string from the second transportation vehicle component 50 as part of the at least one message. In such cases, the random number can be provided for the second transportation vehicle component 50 and/or the first transportation vehicle component, for example, by a third-party ("trustworthy") entity. Alternatively or additionally, the control module 14 can be designed to derive the random number or the random character string from a seed value (starting value). For example, the seed value can be calculated based on a time value (which can be provided, for example, by the trustworthy third-party entity), and specifies the starting point for the calculation of the random number or the random string. The control module 14 can be designed to compare the value received from the second transportation vehicle component 50 with the self-calculated value to legitimate the second transportation vehicle component 50.

In at least some exemplary embodiments the control module 14 can be designed to legitimate the second transportation vehicle component 50 based on cryptographically protected messages from the second transportation vehicle component 50. For example, the cryptographically protected messages can be cryptographically signed. Alternatively or in addition, the cryptographically protected messages can be cryptographically encrypted. For example, the control module 14 can be designed to verify a signature of the at least one received message and/or to decrypt the at least one received message to legitimate the second transportation vehicle component 50. If the signature or the encryption of the at least one received message corresponds to the value expected by the control module 14, then the second transportation vehicle component can be successfully legitimated.

In at least some exemplary embodiments, the control module 14 can be designed to store cryptographic information on previously received cryptographically protected messages from the second transportation vehicle component 50. Alternatively, the control module 14 can be designed to obtain the cryptographic information during the manufacture of the transportation vehicle or at the time of replacement of the first transportation vehicle component or the second transportation vehicle component, for example, during installation of the device, the first transportation vehicle component or the second transportation vehicle component. The cryptographic information may include, for example, information relating to a key, which is used by the second transportation vehicle component 50. The control module 14 can be designed to legitimate the second transportation vehicle component 50 if cryptographically protected messages, which were received within a predefined time interval before the enabling of the transportation vehicle component via the at least one interface 12, are in accordance with the stored cryptographic information. A cryptographically protected message can be in accordance with the stored identification data if a match with the cryptographically protected message is obtained from the cryptographic information, i.e., for example, based on a comparison of character strings, or by calculating a value from the identity and/or the stored cryptographic information. A cryptographically protected message can be in accordance with the stored cryptographic information, for example, if a signature or a key or part of a key is included in the stored cryptographic information, for example, as a hash value or (cryptographic) signature or cryptographic key. Alternatively or additionally, the cryptographically protected message can be in accordance with the stored cryptographic information, for example, if the (derived) identity and the stored cryptographic information can be related by a mathematical function which yields whether the cryptographically protected message and the stored cryptographic information are in accordance. For example, the control module 14 can be designed to compare a signature or an encryption with the cryptographic information to determine whether the signature or the encryption is compatible with the cryptographic information. If it is compatible, then the control module 14 can successfully legitimate the second transportation vehicle component, for example. Alternatively or additionally, the control module 14 can be designed so as to compute a value based on the cryptographic information, and to compare the value with a value received from the second transportation vehicle component. If the values match, then the control module 14 can successfully legitimate the second transportation vehicle component, for example.

Alternatively or in addition, the control module 14 can be designed so as to legitimate the second transportation vehicle component 50 by a plausibility check of the contents of the at least one message. For example, the control module 14 can be designed so as to verify whether the messages received from the second transportation vehicle component contain content which is within an expected range, or whether the messages received from the second transportation vehicle component contain content which differs only within a tolerance range from the content of messages previously received from the transportation vehicle component 50, for example, based on a numbering of messages. The control module 14 can be designed so as to ensure that all data that should be present due to the at least one message, are in fact available and plausible. The plausibility check that is used can be implemented in such a way that it cannot be easily circumvented or faked.

In at least some exemplary embodiments the enabling of the first transportation vehicle component comprises the activation or start of a normal operation of the first transportation vehicle component. For example, the control module 14 can be designed to change a state of the first transportation vehicle component 20 to "normal operation". The normal operation of the first transportation vehicle component can be, for example, a state in which the first transportation vehicle component is fully operational. The first transportation vehicle component can adopt normal operation, for example, after an initialization of the first transportation vehicle component, which can comprise the enabling of the first transportation vehicle component, has taken place.

In at least some exemplary embodiments, the very receipt of the at least one message from the second transportation vehicle component 50 can imply that the second transportation vehicle component 50 has been enabled based on the secured cluster of transportation vehicle components. This may be the case, for example, if the second transportation vehicle component 50 sends the at least one message to the first transportation vehicle component 20 or the device 10 (not until/only) after its successful activation based on the secured cluster of transportation vehicle components. Alternatively or additionally, the at least one message can imply that the second transportation vehicle component 50 has been enabled based on the secured cluster of transportation vehicle components, if the at least one message comprises a pre-defined piece of information, such as information about the fact that the second transportation vehicle component 50 has a predefined state or that a predefined action is being executed by the second transportation vehicle component 50. For example, the at least one received message may imply that the second transportation vehicle component 50 has been enabled based on the secured cluster of transportation vehicle components if the at least one received message implies that the second transportation vehicle component 50 has a predefined state, such as a normal operation state or an enabled state. Alternatively or in addition, the at least one received message may imply that the second transportation vehicle component 50 has been enabled based on the secured cluster of transportation vehicle components, if the at least one received message implies that a predefined action is being executed by the second transportation vehicle component 50, for example, that a starting sequence of a drive component of the transportation vehicle is being performed.

In at least some exemplary embodiments, the secured cluster of transportation vehicle components can comprise at least one further device for enabling a transportation vehicle component according to any one of the preceding exemplary embodiments. For example, the second transportation vehicle component 50 can comprise the additional device. The second transportation vehicle component 50 can be designed, for example, so as to enable the second transportation vehicle component based on a further secured cluster of transportation vehicle components (by legitimating a further transportation vehicle component of the additional secured cluster and enabling the further transportation vehicle component using the additional secured cluster). The second transportation vehicle component and the further secured cluster can either form or be comprised by the secured cluster, on which the activation of the first transportation vehicle component is based. The device 10 (or the first transportation vehicle component 20 with the device 10) can form, together with the secured cluster of transportation vehicle components, a further secured cluster of transportation vehicle components, which can be used transitively for enabling a third transportation vehicle component.

In some exemplary embodiments the at least one interface 12 can also be designed to communicate with a third transportation vehicle component. The third transportation vehicle component may be, for example, part of a further secured cluster of transportation vehicle components of the transportation vehicle. The control module 14 can be designed to receive at least one further message from the third transportation vehicle component via the at least one interface. The control module 14 can be designed to legitimate the third transportation vehicle component based on the at least one further message received from the third transportation vehicle component. The control module 14 can be designed to enable the first transportation vehicle component if the at least one further received message implies that the third transportation vehicle component has been enabled based on the further secured cluster of transportation vehicle components and if the legitimation of the third transportation vehicle component is successful. This can take place alternatively or cumulatively to the enabling based on the second transportation vehicle component. In the alternative case, the control module 14 can be designed to enable the first transportation vehicle component if the at least one received message implies that the second transportation vehicle component has been enabled based on the secured cluster of transportation vehicle components and if the legitimacy of the second transportation vehicle component is successful, or if the at least one further received message implies that the third transportation vehicle component has been enabled based on the further secured cluster of transportation vehicle components and if the legitimacy of the third transportation vehicle component is successful. In the cumulative case, the control module 14 can be designed to enable the first transportation vehicle component if the at least one received message implies that the second transportation vehicle component has been enabled based on the secured cluster of transportation vehicle components and if the legitimacy of the second transportation vehicle component is successful, and if the at least one further received message implies that the third transportation vehicle component has been enabled based on the further secured cluster of transportation vehicle components and if the legitimacy of the third transportation vehicle component is successful.

In at least one exemplary embodiment a vehicle-to-vehicle communication module 20 comprises the device 10. The vehicle-to-vehicle communication module 20 in this exemplary embodiment is the first transportation vehicle component 20. A vehicle-to-vehicle communication of the vehicle-to-vehicle communication module 20 can be based on the enabling of the vehicle-to-vehicle communication module. For example, the vehicle-to-vehicle communication module can be designed to communicate via vehicle-to-vehicle communication only if the vehicle-to-vehicle communication has been enabled. The enabling can be carried out, for example, by messages that are used in the normal operation of the vehicle-to-vehicle communication module. If, for example, a location tracking module belongs to the secured network (perhaps as a second transportation vehicle component), then the at least one message can use location data of the tracking module; if the tracking module sends data, then enabling of the tracking module by the at least one message can thereby trigger the enabling of the vehicle-to-vehicle communication module.

More details and facets of the device 10 and/or the method are mentioned in connection with the concept or examples that are described earlier or later. The method 10 and/or the device can comprise one or more additional optional features, which correspond to one or more properties of the proposed concept or the examples described, whether described earlier or later.

In the following, exemplary embodiments refer to an example of a vehicle-to-vehicle control unit (also vehicle-to-vehicle communication module). This may correspond to the first transportation vehicle component, such as have been introduced in connection with FIGS. 1 and 2. The following exemplary embodiments are also applicable to other transportation vehicle components and are not limited to vehicle-to-vehicle control units. In general, the concept is also applicable to other systems having a plurality of components, such as an affiliation (of a processing unit) to a distributed cluster of computational units.

In at least some examples the Car2Car (vehicle-to-vehicle) control unit, as part of its standard functionality (for example, its normal operation), can (or must) receive data from various other control units (e.g., speed, steering angle, GPS position etc.). These data can (or should) be transmitted in an authenticated manner, in other words cryptographically protected against tampering. This may already be necessary for other reasons, e.g., to prevent security problems. The transmitted data can correspond, for example, to the at least one message.

The Car2Car control unit, due to the fact that it receives cryptographically protected information as part of its normal functional communication, can already determine, for example, that further control units associated with the transportation vehicle are located in the communication cluster. For example, at least some of the control units can form the secured cluster of FIGS. 1 and 2. An attacker would need to have removed and put all control units into operation, so that the control unit can function outside of the transportation vehicle. This method can be qualitatively scalable by additional actions (for example. terminal exchange, WFS-authentication, etc.) of the transportation vehicle being authentically signaled. It can be transitively scalable by chains of actions, each of which is cryptographically secured, having to be carried out. Therefore, in at least some examples the precondition for the decision to send can be scaled in accordance with the requirements on the confidence level.

In at least some exemplary embodiments no separate function to determine the membership of the cluster is required, as this can be based, for example, on messages that the vehicle-to-vehicle control unit receives in normal operation. Possible overhead can be reduced or minimized, since the tamper protection can relate to existing communication, and in some exemplary embodiments no extra messages need to be introduced exclusively for the cluster authentication. In at least some exemplary embodiments the system scales up to any number of control units. The greater number of additional control devices from which the Car2Car control unit receives protected function data, the more certain it can be of being really located in the transportation vehicle. In addition, a content-based scalability can be provided by additional control units and states. A cryptographic scalability can be achieved by the use of more messages from different senders—in some embodiments, more messages from different senders must be authenticated, these would have to be faked to circumvent the security (protection).

In addition, transitivity can be used. If other control units (transportation vehicle components) have other properties, which confirm their installation in the transportation vehicle, this can be transitively extended. For example, if a control unit is part of the (cryptographically protected) immobilizer cluster (for example, the secured cluster) and only starts to send the function data once it has detected its own cluster affiliation (for example, was enabled based on the secured cluster), then this property can be automatically transferred to the Car2Car control unit (e.g., gearbox authenticates BCM (Body Control Module, a central control module in motor transportation vehicles) and cannot transmit to the Car2Car control unit until after the authentication→therefore the Car2Car-control unit can know that the BCM is authentic, without itself having talked to it).

An actuator, in the example the transmitter module in the C2C control unit can (always) link its decision to send to an enable state to be verified. This condition is (only) reached, for example, when certain authenticity operations have been carried out, thus if cryptographically authenticated messages (for example, the at least one message) can be authenticated in the actuator control unit. These operations can be selected to scale the confidence level for the enabling action.

The Car2Car control unit can, for example, receive tamper-proof data from control units which are difficult to remove from the transportation vehicle, such as, e.g., the gearbox or engine. Furthermore, potential control devices are those which are already are integrated in other authentication clusters (for example, in the secured cluster). In addition, the number of the control devices can be as high as possible. Moreover, the cryptographic keys can have a sufficient distribution inside the transportation vehicle (for example, a high Hamming distance), so that for each data point, the Car2Car control unit can clearly identify the control unit from which it originates (for example, for legitimating the second transportation vehicle component). In some examples, only when all these data or messages have been checked as authentic, can an operation be enabled, in this case the sending of the C2C-messages.

The data can be, but need not be, cryptographically protected. The Car2Car control unit can be designed so as to ensure that all data that should be present, are in fact present and plausible. The plausibility check that is used can be implemented in such a way that it cannot be easily circumvented or faked. In the case of cryptographically protected messages, the cryptographic keys can be the same in all control units, to facilitate their initial distribution, wherein it can be ensured that the keys are not exposed due to programming errors.

Figure 3A:
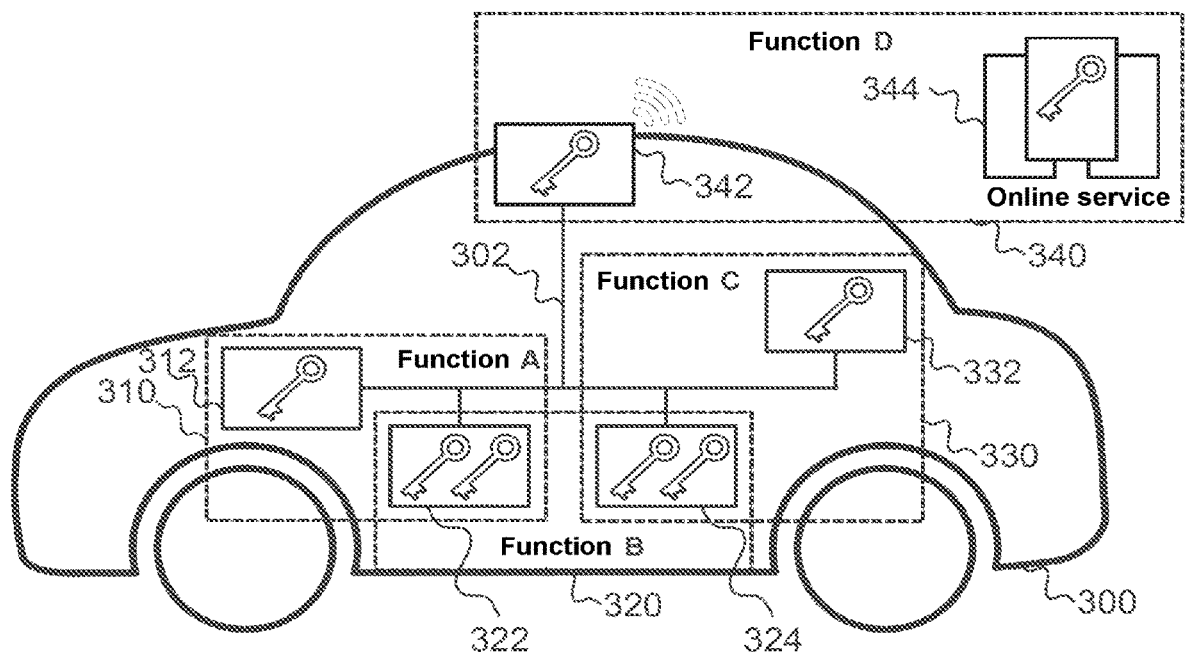
FIGS. 3a-3e show exemplary embodiments of a scalable cluster authentication.

FIG. 3a shows an exemplary embodiment of a scalable cluster authentication. In a transportation vehicle 300, four different functions A 310, B 320, C 330 and D 340 are implemented, wherein function D comprises a control unit 342 for communication with an online service 344. The functions of A-D are each carried out by control units with their separate keys. Function A is based on the control units 312 and 322, function B on control units 322 and 324, function C on control units 324 and 332 and function D on control unit 342. Each control unit comprises at least one key; control devices that are assigned to more than one function (e.g., 322; 324) can comprise more than one key. The communication between the control units can be authenticated by the keys. The control devices can be assigned keys at the manufacturing stage, for example. The control units 312, 322, 324, 332 and 342 are connected to each other via a common communication link, such as a bus 302.

Figure 3B:
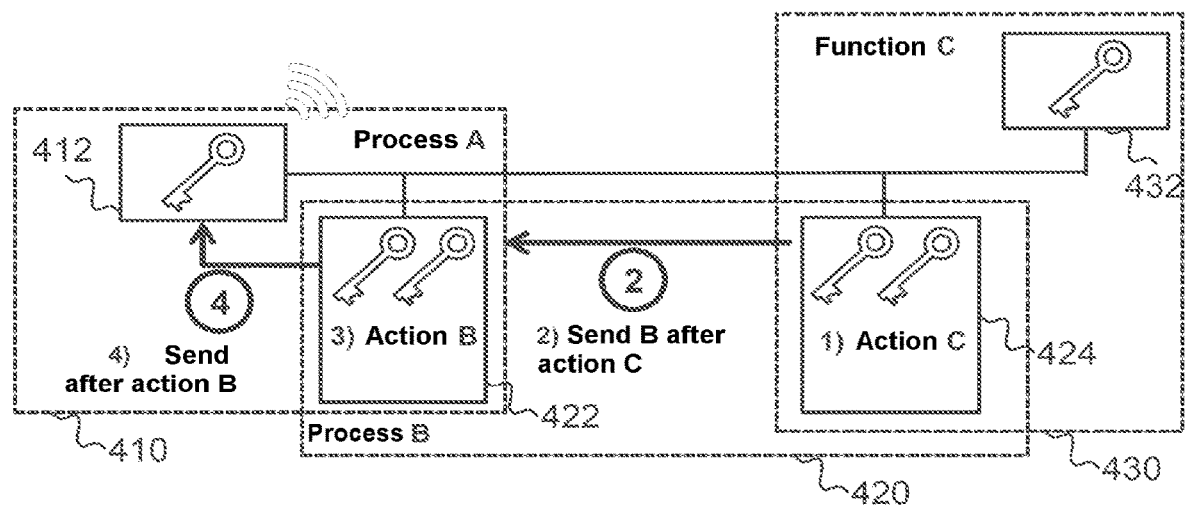

FIG. 3b shows an exemplary embodiment, in which the enabling of a control unit is triggered by a transitivity of transportation vehicle actions (states). Process A 410 is based on the control devices 412 (for example, a control unit for communication) and the control unit 422, sequence B 420 is based on the control units 422 and 424, and function C 430 is based on the control units 424 and 432. Each control unit comprises at least one key; control units that are assigned to more than one function (e.g., 422; 424) can comprise more than one key. The communication between the control units can be authenticated by the keys. The control units 412, 424 and 432 are connected to each other via a common communication link, such as a bus. If function C is now performed by control unit 424 (1) (e.g., control unit 424 has been enabled based on a secured cluster) and the control unit 422 is notified of this (2) after the action C within the process B (for example, via the at least one message), then the control unit 422 can perform (3) action B (for example, to enable the control unit 422 as the first control unit) and after performing the action B, notify control module 412 (4) (so that this can be transitively enabled), and therefore enable a communication of the control module 412. Therefore, an enabling can be triggered by sequentially performed actions in the transportation vehicle. An action such as a terminal signal can trigger the sending of an authentic message (e.g., the message from control unit 424 to control unit 422, or the message from control unit 422 to control unit 412, which can correspond to the at least one message of FIGS. 1 and 2), thereby facilitating the enabling of the control unit 412.

Figure 3C:
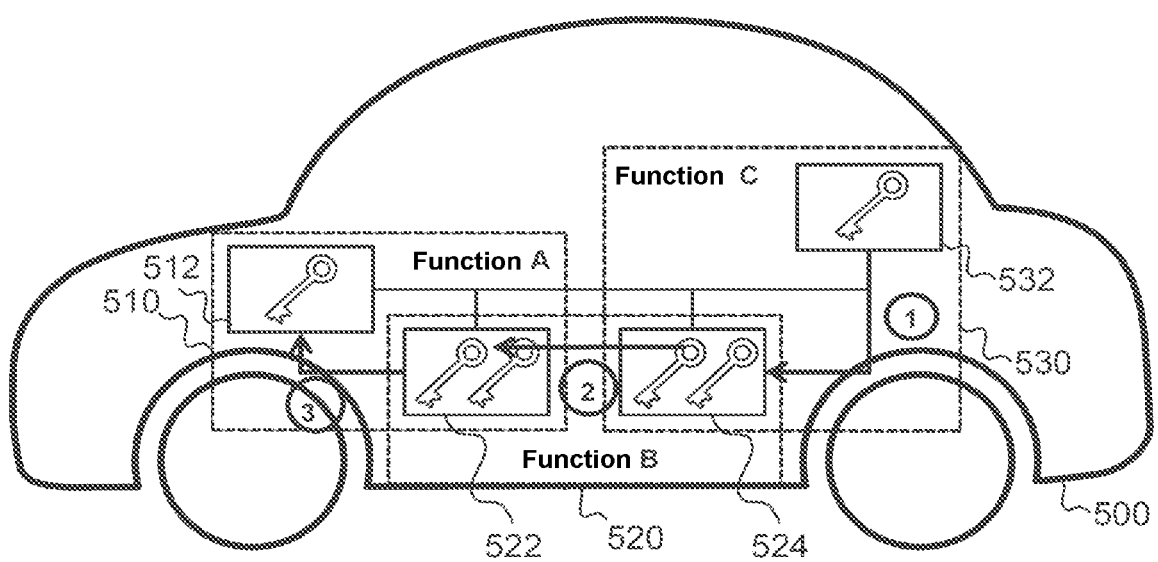

FIG. 3c shows an exemplary embodiment in which the enabling of a control unit is triggered by a transitivity of cryptographic operations (states). In this case, cryptographic operations performed sequentially using different keys can be used. A transportation vehicle 500 comprises the functions A 510, B 520 and C 530. Function A is based on the control units 512 and 522, function B is based on the control units 522 and 524 and function C is based on the control units 524 and 532. Each control unit comprises at least one key; control devices that are assigned to more than one function (e.g., 522; 524) can comprise more than one key. The communication between the control units can be authenticated by the keys. The control units are connected to each other via a common communication link, such as a bus. In a first cryptographic operation (1), control unit 532 can enable control unit 524 (for example, by legitimating the control unit 532 against the control unit 524 by at least one cryptographically protected message), in a second cryptographic operation (2) control unit 524 can (transitively) enable control unit 522 (for example, by legitimating the control unit 524 against the control unit 522 by at least one cryptographically protected message), and in a third cryptographic operation (3) control unit 522 can (transitively)

enable control unit 512 (as before). The cryptographic operations (1), (2) and (3) can build upon each other, for example, being (mandatorily) performed in this order. The cryptographic operations can comprise sending a cryptographic message and/or performing a cryptographic challenge/response procedure.

Figure 3D:
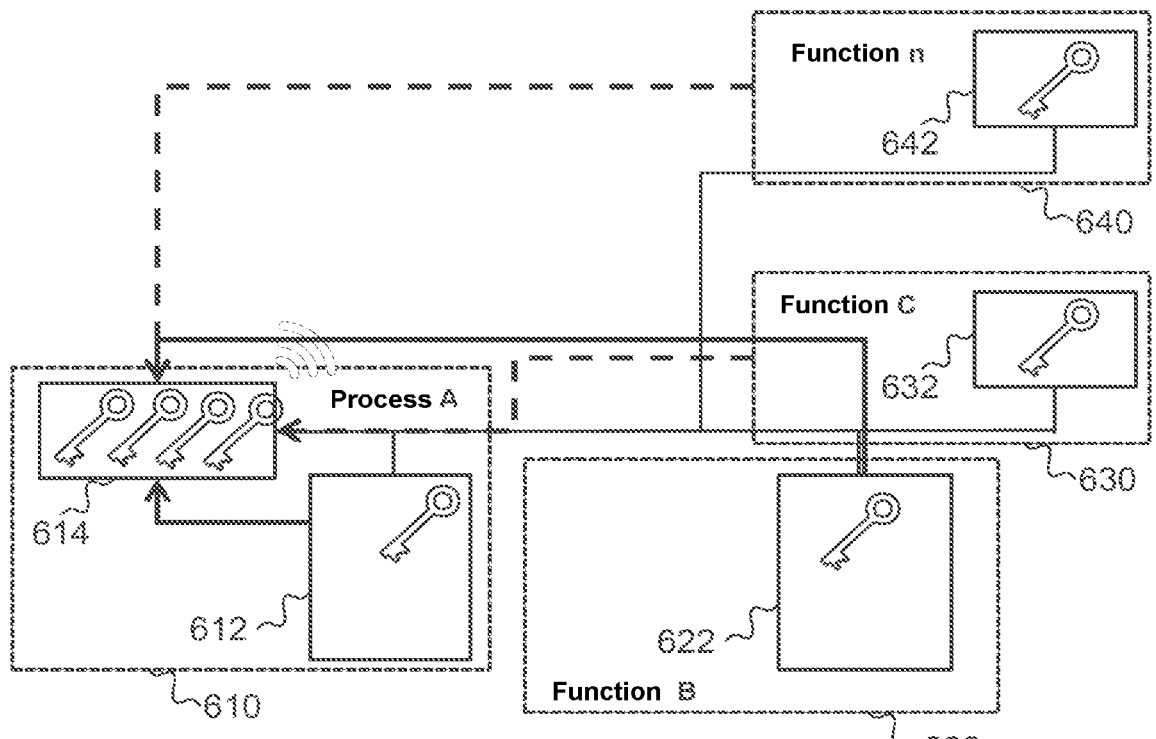

FIG. 3d shows a cryptographic scalability of the enabling of control units by sequentially performed operations in the transportation vehicle, wherein an action (for example, a terminal signal, . . . ) triggers the sending of an authentic message. FIG. 3d shows process A 610, function B 620, function C 630 and function n 640. Process A is based on the control unit 614 (to be enabled) and the control unit 612, function B is based on control unit 622, function C is based on control unit 632 and function n is based on control unit 642. Each control unit comprises at least one key; if a control unit communicates with more than one other control unit (e.g., the control unit 614 to be enabled with the control units 612, 622, 632 and 642, then this control unit can comprise a plurality of keys (for example, 4 keys). The communication between the control units can be authenticated by the keys. The control units are (at least partially) connected to each other via a common communication link, such as a bus. In this case, the control unit 614 can be enabled—alternatively or cumulatively—based on cryptographic operations (which can be implemented in a similar way to the cryptographic operations of FIG. 3c) of the other control devices 612, 622, 632, 642. For example, each of the control units 612, 622, 632 and 642 can be part of a secured cluster. Control unit 614 can be designed to legitimate control units 612, 622, 632 and 642, and if one (alternative enabling) or all (cumulative enabling) of them are enabled, to enable themselves.

Figure 3E:
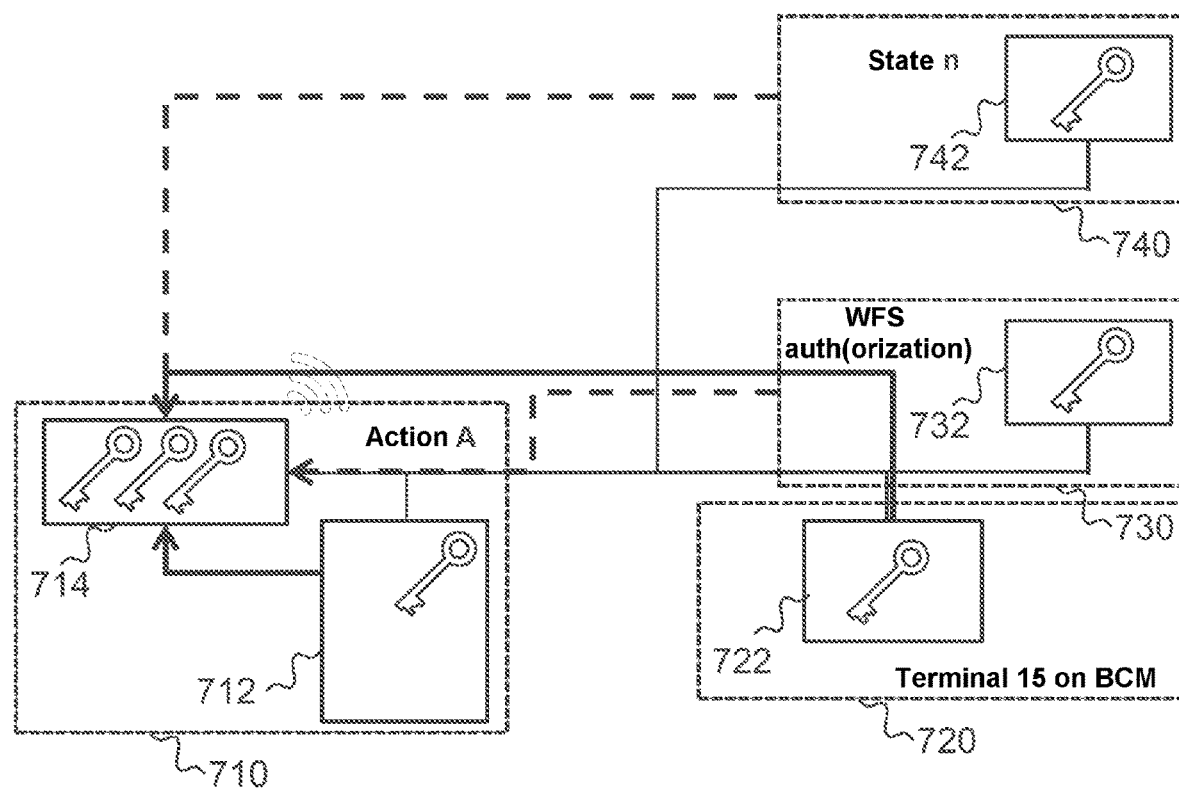

FIG. 3e shows a scalability of the enabling by transportation vehicle operations (states). The system can be scaled up to any number of control units. The greater number of additional control devices from which the Car2Car control unit receives protected function data, the more certain it can be, for example, that it is really located in the transportation vehicle. FIG. 3e shows action A 710 and functions B (terminal 15 on BCM) 720, C (immobilizer authentication) 730 and N (state n) 740. Action A is based on the control unit 714 to be enabled and the control unit 712, function B is based on control unit 722, function C is based on control unit 732 and function N is based on control unit 742. Each control unit comprises at least one key; if a control unit communicates with more than one other control unit (e.g., the control unit 714 to be enabled with the control units 712, 722, 732 and 742, then this control unit can comprise a plurality of keys (for example, 4 keys). The communication between the control units can be authenticated by the keys. The control units are (at least partially) connected to each other via a common communication link, such as a bus. In this case, the control unit 714 to be enabled can be enabled—alternatively or cumulatively—based on actions of the other control units 712, 722, 732, 742. For example, each of the control units 712, 722, 732 and 742 can be part of a secured cluster. Control unit 714 can be designed to legitimate control units 712, 722, 732 and 742, and if one (alternative enabling) or all (cumulative enabling) of them is/are enabled, to enable themselves. The scalability in terms of content can be achieved by additional control units and states.

More details and facets of the control units (transportation vehicle components) and/or transportation vehicle of FIGS. 3a to 3e are mentioned in connection with the concept or examples that were described earlier (e.g., FIGS. 1 and 2).

The control units or the transportation vehicles can comprise one or more additional optional features, which correspond to one or more properties of the proposed concept or the examples described, whether described above or below.

Another exemplary embodiment is a computer program for implementing at least one of the methods described above, when the computer program is executed on a computer, a processor or a programmable hardware component. Another exemplary embodiment is also a digital storage medium, which is machine- or computer-readable, and has electronically readable control signals, which can interact with a programmable hardware component such that one of the methods described above is executed.

The features disclosed in the present description, the claims and the drawings can be of significance and implemented both individually as well as in any desired combination to realize an exemplary embodiment in its various configurations.

Although some facets have been described in connection with a device, it goes without saying that these facets also represent a description of the corresponding method, so that a block or a component of a device is also to be understood as a corresponding method operation or as a feature of a method operation. Similarly, properties that have been described in relation to or as a method operation also represent a description of a corresponding block or detail or feature of a corresponding device.

Depending on the specific implementation requirements, exemplary embodiments can be implemented either in hardware or in software. The implementation can be carried out by using a digital storage medium, such as a floppy disk, a DVD, a Blu-Ray disc, a CD, a ROM, a PROM, or an EPROM, EEPROM or Flash memory, a hard disk or other magnetic or optical storage, on which electronically readable control signals are stored, which can interact with a programmable hardware component, or interact in such a way that the respective method is carried out.

A programmable hardware component can be formed by a processor, a computer processor (CPU=Central Processing Unit), a graphics processing unit (GPU=Graphics Processing Unit), a computer, a computer system, an application-specific integrated circuit (ASIC), an integrated circuit (IC), a single-chip system (SOC=System-on-Chip), a programmable logic element or a field-programmable gate array (FPGA) with a microprocessor.

The digital storage medium can therefore be machine- or computer-readable. Some exemplary embodiments thus comprise a data carrier, which has electronically readable control signals that are capable of interacting with a programmable computer system or a programmable hardware component, in such a way that one of the methods described herein is carried out. At least one exemplary embodiment therefore is a data carrier (or a digital storage medium or a computer-readable medium), on which the program is recorded for carrying out one of the methods described herein.

In general, exemplary embodiments can be implemented as software, firmware, computer program or computer program product with a program code or as data, wherein the program code is, or the data are, effective in terms of carrying out one of the methods if the program is running on a processor or a programmable hardware component. The program code or the data can also be stored, for example, on a machine-readable medium or data carrier. The program code or the data can exist as source code, machine code or byte code, among other things, as well as other intermediate code.

Another exemplary embodiment is also a data stream, a signal train or a sequence of signals, which represent or represents the program for carrying out one of the methods described herein. The data stream, the signal train or the sequence of signals can be configured, for example, so as to be transferred over a data communication connection, for example, via the internet or any other network. Exemplary embodiments are thus also signal trains representing data, which are suitable for transferring over a network or a data communication connection, wherein the data represent the program.

A program in accordance with at least one exemplary embodiment can implement one of the methods during its implementation, for example, by the program reading out memory locations or writing a datum or plurality of data into these locations, which enables switching operations or other operations to be invoked in transistor structures, in amplifier structures or in other electrical, optical, magnetic components or components operating according to another functional principle. Accordingly, by reading from a memory location, data, values, sensor values or other information can be recorded, determined or measured by a program. By reading out one or more memory locations, a program can therefore detect, determine or measure variables, values, measurement variables and other information, and can also by writing to one or more memory locations perform, initiate or implement an action, and also control other equipment, machinery and components.

The examples described above only represent an illustration of the principles of the present disclosure. It is implicit that modifications and variations of the arrangements and details described herein will be apparent other persons skilled in the art. It is therefore intended that the disclosed embodiments be limited only by the scope of protection of the following patent claims and not by the specific details, which have been presented herein on the basis of the description and explanation of the exemplary embodiments.

| 10 | device |
|---|---|
| 12 | interface |
| 14 | control module |
| 20 | first transportation vehicle component |
| 50 | second transportation vehicle component |
| 100 | transportation vehicle |
| 110 | receiving at least one message |
| 120 | legitimating of the second transportation vehicle component |
| 130 | enabling the first transportation vehicle component |
| 300 | transportation vehicle |
| 310 | function A |
| 302 | common communication connection/bus |
| 312 | control unit |
| 320 | function B |
| 322 | control unit |
| 324 | control unit |
| 330 | function C |
| 332 | control unit |
| 340 | function D |
| 342 | control unit |
| 410 | sequence A |
| 412 | control unit |
| 420 | sequence B |
| 422 | control unit |
| 424 | control unit |
| 430 | function C |
| 432 | control unit |
| 500 | transportation vehicle |
| 510 | function A |
| 512 | control unit |
| 520 | function B |
| 522 | control unit |
| 524 | control unit |
| 530 | function C |
| 532 | control unit |
| 610 | sequence A |
| 612 | control unit |
| 620 | function B |
| 622 | control unit |
| 630 | function C |
| 632 | control unit |
| 640 | function n |
| 642 | control unit |
| 710 | sequence A |
| 712 | control unit |
| 720 | function B |
| 722 | control unit |
| 730 | function C |
| 732 | control unit |
| 740 | function n |
| 742 | control unit |

The invention claimed is:

1. A device for enabling a first transportation vehicle component of a transportation vehicle, the device comprising:
at least one interface for communication with a second transportation vehicle component of the transportation vehicle, wherein the second transportation vehicle component is part of a secured cluster of transportation vehicle components of the transportation vehicle; and
a control module for:
controlling the at least one interface,
receiving at least one message from the second transportation vehicle component via the at least one interface,
legitimizing the second transportation vehicle component based on the at least one message received by the second transportation vehicle component, and
enabling the first transportation vehicle component in response to the at least one received message implying that the second transportation vehicle component has been enabled based on the secured cluster of transportation vehicle components, and in response to the legitimization of the second transportation vehicle component being successful,
wherein the secured cluster of transportation vehicle components includes a plurality of transportation vehicle components including the second transportation vehicle component that are interconnected such that a compromise of any transportation vehicle component of the plurality of transportation vehicle components prevents enabling of the other transportation vehicle components of the plurality of transportation vehicle components of the secured cluster,
wherein the first transportation vehicle component and the plurality of transportation vehicle components are components of the transportation vehicle configured to communicate with each other,
wherein the first transportation vehicle component is not one of the secured cluster of transportation vehicle components,
wherein the second transportation vehicle component is enabled whereby a defect in the first transportation vehicle component does not immobilize the secured cluster of transportation vehicle components, wherein the control module legitimates the second transportation vehicle component based on cryptographically protected messages from the second transportation vehicle component, and wherein the cryptographically protected messages comprise a calculated value based on a cryptographic key and based on a random number or a random number character string, wherein the control module derives the random number or random number character string from a seed starting value which is calculated based on a time value indicating a starting point for the calculation of the random number or random number character string.

2. The device of claim 1, wherein the control module legitimates the second transportation vehicle component based on a challenge-response authentication method.

3. The device of claim 1, wherein the control module legitimates the second transportation vehicle component by a plausibility check of the contents of the at least one message.

4. The device of claim 1, wherein the cryptographically protected messages are cryptographically signed and/or wherein the cryptographically protected messages are cryptographically encrypted.

5. The device of claim 1, wherein the control module stores cryptographic information about previously received cryptographically protected messages of the second transportation vehicle component, and wherein the control module legitimates the second transportation vehicle component in response to the cryptographically protected messages, which have been received via the at least one interface within a predefined time interval before the transportation vehicle component was enabled, being in accordance with the stored cryptographic information.

6. The device of claim 1, wherein the secured cluster is an immobilizer cluster of the transportation vehicle, or wherein the secured cluster is an anti-theft cluster of the transportation vehicle.

7. The device of claim 1, wherein the receipt of the at least one message from the second transportation vehicle component implies that the second transportation vehicle component has been enabled based on the secured cluster of transportation vehicle components.

8. The device of claim 1, wherein the at least one received message implies that the second transportation vehicle component has been enabled based on the secured cluster of transportation vehicle components, in response to the at least one received message implying that the second transportation vehicle component has a predefined condition.

9. The device of claim 1, wherein the secured cluster of transportation vehicle components comprises at least one other device for enabling a first transportation vehicle component of a transportation vehicle, and/or wherein the device together with the secured cluster of transportation vehicle components forms a further secured cluster of transportation vehicle components.

10. The device of claim 1, wherein the at least one message, on which the enabling of the first transportation vehicle component is based, is at least a message which is used for the normal operation of the first transportation vehicle component or for the normal operation of the second transportation vehicle component, and/or wherein the at least one message, on which the enabling of the first transportation vehicle component is based, is at least a message which is not received solely for the purpose of enabling the transportation vehicle component via the at least one interface, or which is not sent from the second transportation vehicle component solely for the purpose of enabling the first transportation vehicle component.

11. A vehicle-to-vehicle communication module having a device for enabling a first transportation vehicle component of a transportation vehicle, the device comprising:

at least one interface for communication with a second transportation vehicle component of the transportation vehicle, wherein the second transportation vehicle component is part of a secured cluster of transportation vehicle components of the transportation vehicle; and a control module for:

controlling the at least one interface, receiving at least one message from the second transportation vehicle component via the at least one interface, legitimizing the second transportation vehicle component based on the at least one message received by the second transportation vehicle component, and enabling the first transportation vehicle component in response to the at least one received message implying that the second transportation vehicle component has been enabled based on the secured cluster of transportation vehicle components, and in response to the legitimization of the second transportation vehicle component being successful, wherein the vehicle-to-vehicle communication module is the first transportation vehicle component, and wherein a vehicle-to-vehicle communication of the vehicle-to-vehicle communication module is based on the enabling of the vehicle-to-vehicle communication module, wherein the secured cluster of transportation vehicle components includes a plurality of transportation vehicle components including the second transportation vehicle component that are interconnected such that a compromise of any transportation vehicle component of the plurality of transportation vehicle components prevents enabling of the other transportation vehicle components of the plurality of transportation vehicle components of the secured cluster, wherein the first transportation vehicle component and the plurality of transportation vehicle components are components of the transportation vehicle configured to communicate with each other, wherein the first transportation vehicle component is not one of the secured cluster of transportation vehicle components, wherein the second transportation vehicle component is enabled whereby a defect in the first transportation vehicle component does not immobilize the secured cluster of transportation vehicle components, wherein the control module legitimates the second transportation vehicle component based on cryptographically protected messages from the second transportation vehicle component, and wherein the cryptographically protected messages comprise a calculated value based on a cryptographic key and based on a random number or a random number character string, wherein the control module derives the random number or random number character string from a seed starting value which is calculated based on a time value indicating a starting point for the calculation of the random number or random number character string.

12. A method for enabling a first transportation vehicle component of a transportation vehicle, the method comprising:
- receiving at least one message from a second transportation vehicle component, wherein the second transportation vehicle component is part of a secured cluster of transportation vehicle components of the transportation vehicle;
- legitimizing the second transportation vehicle component based on the at least one message received from the second transportation vehicle component; and
- enabling the first transportation vehicle component in response to the at least one received message implying that the second transportation vehicle component has been enabled based on the secured cluster of transportation vehicle components, and in response to the legitimization of the second transportation vehicle component being successful,
- wherein the secured cluster of transportation vehicle components includes a plurality of transportation vehicle components including the second transportation vehicle component that are interconnected such that a compromise of any transportation vehicle component of the plurality of transportation vehicle components prevents enabling of the other transportation vehicle components of the plurality of transportation vehicle components of the secured cluster,
- wherein the first transportation vehicle component and the plurality of transportation vehicle components are components of the transportation vehicle configured to communicate with each other,
- wherein the first transportation vehicle component is not one of the secured cluster of transportation vehicle components,
- wherein the second transportation vehicle component is enabled whereby a defect in the first transportation vehicle component does not immobilize the secured cluster of transportation vehicle components,
- wherein the second transportation vehicle component is legitimated based on cryptographically protected messages from the second transportation vehicle component, and
- wherein the cryptographically protected messages comprise a calculated value based on a cryptographic key and based on a random number or a random number character string, wherein the random number or random number character string is derived from a seed starting value which is calculated based on a time value indicating a starting point for the calculation of the random number or random number character string.

13. A non-transitory computer readable medium including a program with a program code for carrying out a method for enabling a first transportation vehicle component of a transportation vehicle when the program code is executed on a computer, a processor, a control module or a programmable hardware component, the program being configured to enable the first transportation vehicle component and to:
- receive at least one message from a second transportation vehicle component, wherein the second transportation vehicle component is part of a secured cluster of transportation vehicle components of the transportation vehicle;
- legitimize the second transportation vehicle component based on the at least one message received from the second transportation vehicle component; and
- enable the first transportation vehicle component in response to the at least one received message implying that the second transportation vehicle component has been enabled based on the secured cluster of transportation vehicle components, and in response to the legitimization of the second transportation vehicle component being successful, and
- wherein the secured cluster of transportation vehicle components includes a plurality of transportation vehicle components including the second transportation vehicle component that are interconnected such that a compromise of any transportation vehicle component of the plurality of transportation vehicle components prevents enabling of the other transportation vehicle components of the plurality of transportation vehicle components of the secured cluster,
- wherein the first transportation vehicle component and the plurality of transportation vehicle components are components of the transportation vehicle configured to communicate with each other,
- wherein the first transportation vehicle component is not one of the secured cluster of transportation vehicle components,
- wherein the second transportation vehicle component is enabled whereby a defect in the first transportation vehicle component does not immobilize the secured cluster of transportation vehicle components,
- wherein the second transportation vehicle component is legitimated based on cryptographically protected messages from the second transportation vehicle component, and
- wherein the cryptographically protected messages comprise a calculated value based on a cryptographic key and based on a random number or a random number character string, wherein the random number or random number character string is derived from a seed starting value which is calculated based on a time value indicating a starting point for the calculation of the random number or random number character string.

14. The device of claim 1, further comprising:
enabling the second transportation vehicle component,
wherein the second transportation vehicle component only sends the at least one message in response to the second transportation vehicle component being enabled such that a receipt of the message by the control module confirms that the second transportation vehicle component has been enabled.

15. The device of claim 1, wherein the at least one received message implies that the second transportation vehicle component has been enabled based on the secured cluster of transportation vehicle components in response to the at least one received message implying that a predefined action is being executed by the second transportation vehicle component, the predefined action being an action performed by the second transportation vehicle component in normal operation.

16. The device of claim 15, wherein the predefined action includes at least one of measurements which indicate the normal operation of the second transportation vehicle component and messages which indicate the normal operation of the second transportation vehicle component.

* * * * *